United States Patent

Wicklund

[11] Patent Number: 6,034,958
[45] Date of Patent: Mar. 7, 2000

[54] VP/VC LOOKUP FUNCTION

[75] Inventor: Goran Wicklund, Nack, Sweden

[73] Assignee: Telefonaktiebolaget LM Ericsson, Stockholm, Sweden

[21] Appl. No.: 08/893,479

[22] Filed: Jul. 11, 1997

[51] Int. Cl.[7] .............................. H04L 12/56; H04J 3/00
[52] U.S. Cl. .......................... 370/395; 370/397; 370/401; 370/476
[58] Field of Search ..................... 370/392, 395, 370/396, 397, 399, 413, 473, 476, 401, 402, 403, 404; 709/200

[56] References Cited

U.S. PATENT DOCUMENTS

| | | | |
|---|---|---|---|
| 5,414,701 | 5/1995 | Shtayer et al. | 370/395 |
| 5,418,786 | 5/1995 | Loyer et al. | 370/395 |
| 5,440,552 | 8/1995 | Sugita | 370/395 |
| 5,455,825 | 10/1995 | Lauer et al. | 370/413 |
| 5,467,349 | 11/1995 | Huey et al. | 370/397 |
| 5,481,687 | 1/1996 | Goubert et al. | 370/392 |
| 5,530,806 | 6/1996 | Condon et al. | 370/397 |
| 5,555,256 | 9/1996 | Calamvokis | 370/399 |
| 5,708,659 | 1/1998 | Rostoker et al. | 370/401 |
| 5,852,607 | 12/1998 | Chin | 370/401 |
| 5,889,949 | 3/1999 | Charles | 709/200 |

FOREIGN PATENT DOCUMENTS

| | | |
|---|---|---|
| 0 847 217 A1 | 6/1998 | European Pat. Off. . |
| 2217488 | 10/1989 | United Kingdom . |
| 2301913 | 12/1996 | United Kingdom . |
| 2 302 913 | 2/1997 | United Kingdom . |
| WO97/13377 | 4/1997 | WIPO . |

OTHER PUBLICATIONS

Chandranmenon et al., "Trading Packet Headers for Packet Processing," *IEEE/ACM Transactions on Networking*, vol. 4, No. 2, pp. 141–152 Apr. 1, 1996, New York, US.

Pei, et al., VLSI Implementation of Routing Tables: Tries and CAMS, Networking in the Nineties, *IEEE/ACM Transactions on Networking*, vol. 2, pp. 0515–0524, Bal Harbour, Apr. 1991.

IBM Technical Disclosure Bulletin, vol. 35, No. 3, "Connectionless ATM Network Support Using Virtual Path Connections," pp. 445–448, Aug. 1992.

IBM Technical Disclosure Bulletin, vol. 36, No. 1, "Combined Translation Lookaside Buffer for Page Frame Table and Translation Control Word Entries," pp. 240–242, Jan. 1993.

IBM Technical Disclosure Bulletin, vol. 39, No. 01, "Method for High–Speed Swapping of Asynchronous Transfer Mode Virtual Path Identifier/Virtual Channel Identifier Headers," pp. 225–228, Jan. 1996.

*Primary Examiner*—Alpus H. Hsu
*Assistant Examiner*—Afsar M. Qureshi
*Attorney, Agent, or Firm*—Nixon & Vanderhye P.C.

[57] ABSTRACT

A new, efficient approach to ATM connection table lookup minimizes the number of tables and memory lookups through use of hash coding and binary table search techniques. The virtual connection information associated with an incoming ATM cell is hash coded. The hash code provides a compressed representation of the virtual connection information—allowing the address space of a table accessed based on the hash code to be much smaller than the maximum number of possible virtual connection combinations that can be encoded in the ATM cell header without restricting the set of possible virtual connection combinations. A binary search based on the cell's virtual connection information can be used to efficiently select, from plural records accessed based on the hash code, the particular search record corresponding to the cell's connection.

30 Claims, 6 Drawing Sheets

VP/VC LOOKUP FUNCTION

CROSS REFERENCE TO RELATED APPLICATIONS

This application is related to the following: U.S. patent application Ser. No. 08/893,391 (attorney docket: 1410-321), entitled "VC MERGING FOR ATM SWITCH," filed Jul. 11, 1997; U.S. patent application Ser. No. 08/891,232 (attorney docket: 1410-322), entitled "ABR SERVER," filed Jul. 11, 1997; U.S. patent application Ser. No. 08/890,758 (attorney docket: 1410-323), entitled "HANDLING ATM MULTICAST CELLS," filed Jul. 11, 1997; and U.S. patent application Ser. No. 08/893,576 (attorney docket: 1410-324), entitled "A DATA SHAPER FOR ATM TRAFFIC," filed Jul. 11, 1997.

FIELD OF THE INVENTION

This invention relates to transporting data through a communications network, and more particularly, to efficient connection lookup techniques that can be used in Asynchronous Transfer Mode ("ATM") networks and switches. Still more specifically, the invention relates to a method for efficiently looking up connection information in a ATM switch Virtual Path/Virtual Channel connection table based on hashing and binary search.

BACKGROUND OF THE INVENTION

Asynchronous Transfer Mode (ATM) has emerged as the primary networking technology for next-generation digital communications. ATM provides a connection-based, fast packet switching technology that can be used to deliver many different types of information including audio, video, and data in real time.

ATM has a connection oriented protocol that associates each ATM data packet (called a "cell" in ATM terminology) with a given "virtual channel" supported by a physical link. Each connection is identified by two sub-fields: the Virtual Channel Identifier ("VCI") and the Virtual Path Identifier ("VPI"). Together, these fields are used in multiplexing, demultiplexing and switching a cell through the network. The VCI and VPI are not addresses; they are explicitly assigned at each segment (link between ATM switches) of a connection when the connection is established, and they remain for the duration of the connection.

When an ATM switch receives an incoming cell on an input port, it must determine which output port to route the cell to based on the incoming cell's VPI, VCI and input port physical identifier. The ATM switch must also determine new VPI and VCI values to substitute into the cell header so the cell will be correctly routed by the next ATM network segment. The ATM switch typically looks up this connection information in a VP/VC connection table based on the cell header's VPI and VCI information plus additional "physical layer" (PHY) information identifying the input port. To maximize throughput of cells through the ATM switch, it is important to provide a rapid and efficient technique and arrangement for accessing the proper connection information from the connection table.

Under international ATM standards, the virtual path identifier (VPI) and virtual channel identifier (VCI) fields have the following sizes:

the VPI field is twelve bits long; and the VCI field is sixteen bits long.

A typical size for the physical link identifier (PHY) is 5 bits. Thus, the total length of these three fields together is on the order of thirty-three bits—corresponding to about 8.9 billion ($2^{33}$) combinations. However, the maximum number of connections a particular ATM switch can set up is typically restricted to a much lower value (for example, 16K). In the most general case, it should be possible to use any arbitrary sub-set of the total number of 8.9 billion PHY, VPI, VCI combinations as identifiers for the channels that the ATM switch sets up. The problem is to find an efficient mechanism that can take the PHY, VPI, VCI field (e.g., 33 bits long), find out whether it is a valid combination of bits, and output a pointer to one of a smaller (e.g., 16K) connections in a virtual path/virtual channel connection table sized to accommodate the number of connections the ATM switch can maintain.

U.S. Pat. No. 5,414,701 to Shtayer et al provides one approach to solving this problem. The Shtayer et al. patent describes an address compression method that relies on a hierarchical arrangement of separate link, virtual path, and virtual channel tables. In Shtayer et al, the PHY information indexes into a "link" table that provides a virtual path pointer. The virtual path pointer is used in combination with the VPI from the cell header to index into one of many virtual path tables. The virtual path table provides a virtual channel offset that is, in turn, used in combination with the cell header's VCI to index into one of many virtual channel tables. The virtual channel tables provide ingress connection identifiers that are used to physically route data through an ATM system.

While Shtayer et al's approach may avoid the need for a large, mostly unused connection table, its process of using link information to index a link table, using information looked up in the link table to index a virtual path table, etc. is unduly time consuming and inefficient. Furthermore, it may be difficult to maintain Shtayer et al's complex hierarchically structured, separate link, virtual path and virtual channel tables.

U.S. Pat. No. 5,481,687 to Goubert et al. uses masking to form subsets of reduced addresses that may then be translated to provide a non-overlapping series of relative addresses. Goubert's technique requires a complex use of different masks for selecting different address bits, and may suffer from flexibility problems.

SUMMARY OF THE INVENTION

The present invention provides a new, efficient approach to ATM connection table lookup that minimizes the number of tables and table lookups through use of hash coding and binary table search techniques.

In accordance with one aspect provided in accordance with the present invention, the PHY, VPI and VCI virtual connection information associated with an incoming ATM cell are hash coded to produce a hash code of reduced length. The hash code is used to index into a table sized to correspond to at least the maximum number of active connections the ATM switch is capable of sustaining. The hash code provides a compressed representation of the PHY, VPI, VCI information—allowing the table address space to be much smaller than the maximum number of PHY, VPI, VCI combinations without restricting the set of PHY, VPI, VCI combinations that can be used.

Because the hash coding results in a loss of information, there is no one-to-one correspondence between PHY, VPI, VCI combinations and hash codes. Rather, the hash coding will transform plural PHY, VPI, VCI values into the same hash code. In accordance with another aspect provided by this invention, a search table can maintain a number of different search records corresponding to each hash code. In the preferred example, the search table selects a particular record to retrieve based on the hash code and the PHY, VPI, VCI information associated with the cell.

A binary search is used in the preferred example to efficiently locate the particular search record in the search table. In the preferred example, the search table maintains search records in a binary tree structure. A binary search technique efficiently locates the particular search record corresponding to the ATM cell's VPI/VCI and the PHY physical link identifier.

The present invention thus provides an efficient virtual path/virtual channel table lookup based on hashing and binary search that does not restrict the set of PHY, VPI, VCI combinations used, and minimizes the number of memory accesses.

BRIEF DESCRIPTION OF THE DRAWINGS

These and other features and advantages provided by the present invention will be better and more completely understood by referring to the following detailed description of presently preferred example embodiments in connection with the drawings, of which.

DETAILED DESCRIPTION OF PRESENTLY PREFERRED EXAMPLE EMBODIMENTS

Figure 1:
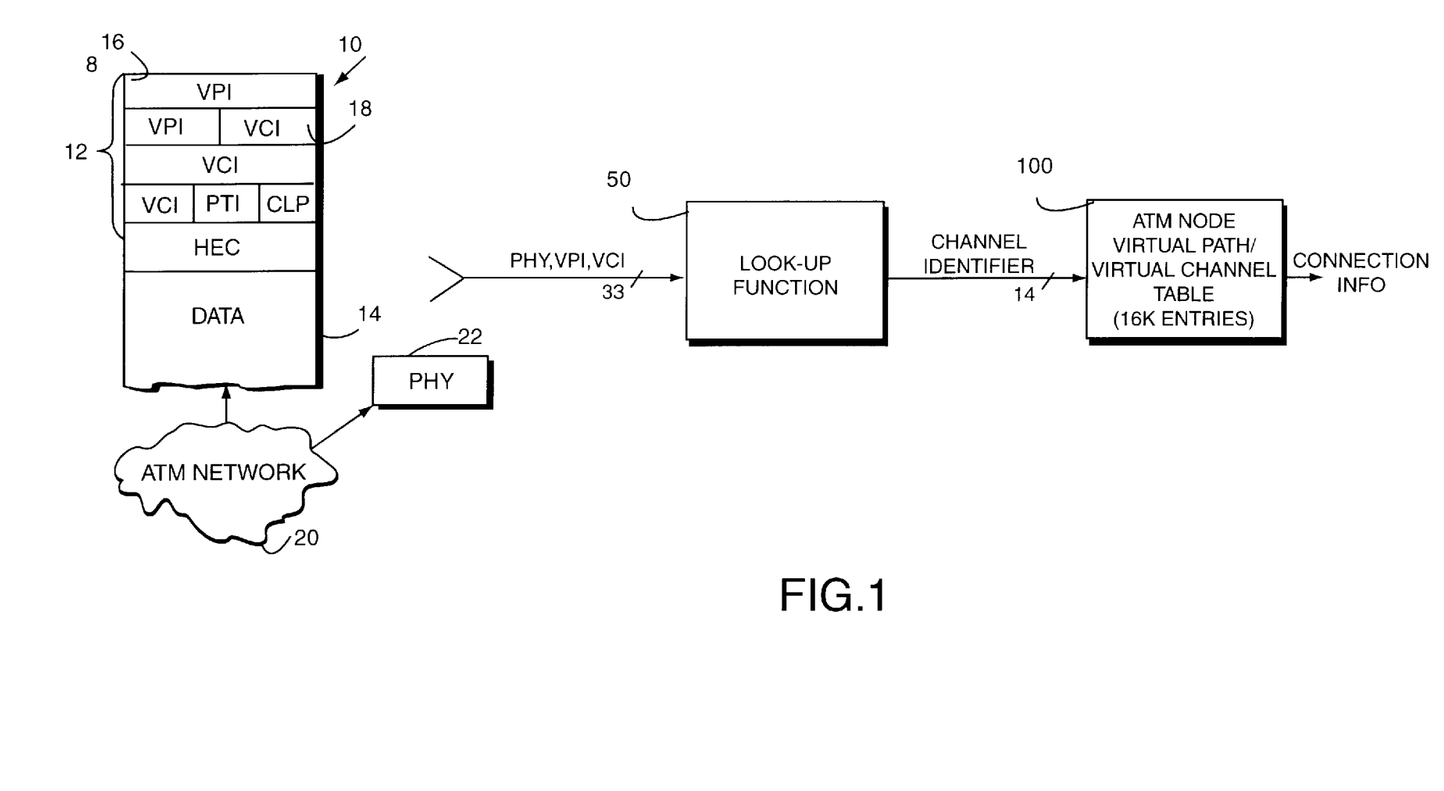
FIG. 1 shows an example of how VPI, VCI and PHY virtual connection information is used in an overall Virtual Path/Virtual Channel lookup process.

FIG. 1 shows an example overall VP/VC lookup process that may, for example, be performed by an ATM switch. In this example, an ATM cell 10 incoming from a segment of ATM network 20 includes a standard header 12 and a data payload 14. Header 12 includes virtual connection information, i.e., a 12-bit virtual path identifier (VPI) 16 and a 16-bit virtual channel identifier (VCI) 18. In addition, a 5-bit PHY field 22 in this example indicates physical interface information (e.g., the ATM switch input port identifier) associated with ATM cell 10.

In this example, VPI 16, VCI 18 and PHY 22 are used to access connection information stored in a virtual path/virtual channel connection or routing table 100. The ATM switch uses connection information from routing table 100 to route ATM cell 10 to a switch output port, and also may obtain new VPI and VCI fields from the routing table to substitute into cell header 10 for use by the next segment of ATM network 20.

In this example, the maximum number of connections the ATM switch can sustain at any given time is 16K. Therefore, connection table 100 stores a maximum of 16K ($2^{14}$) entries—one for each different connection the ATM switch can maintain. Different ATM switches can maintain different numbers of connections; in general, connection table 100 is sized to match the capabilities of the particular ATM switch it is used with. In this particular example, since connection table 100 stores 16K entries, a 14-bit long channel identifier is required to uniquely identify a particular connection record within the connection table.

Simplified Look Up Process

Figure 2:
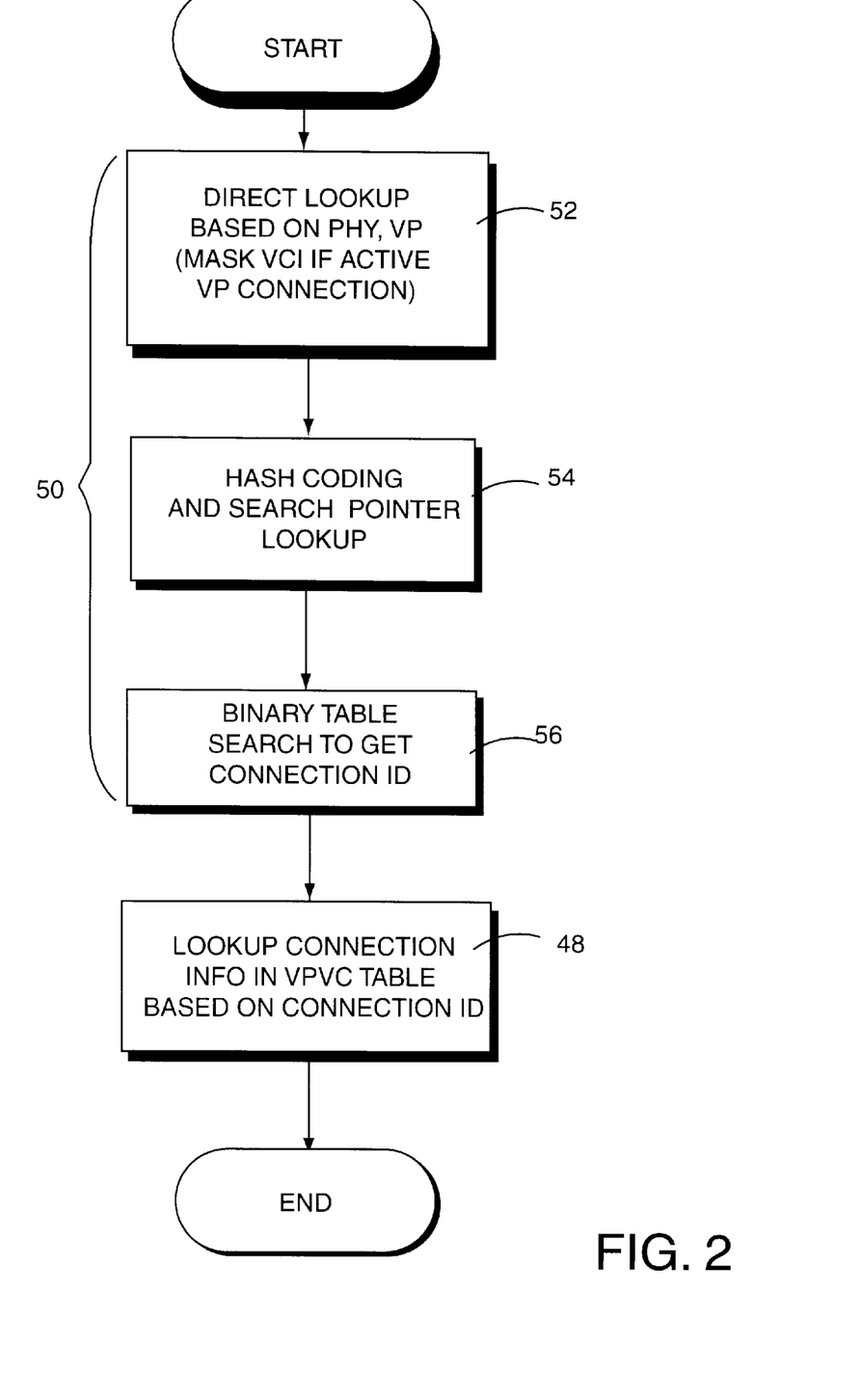
FIG. 2 shows an example simplified process for efficiently looking up VP/VC information based on hash coding and binary search.

In this example, a lookup function 50 provides, based on the combination of PHY 22, VPI 16 and VCI 18, a 14-bit long channel identifier for looking up entries within connection table 100. Lookup function 50 in this example consists of three discrete steps shown in the FIG. 2 example simplified lookup process:

1. PHY, VP direct lookup (step 52),
2. Hash-coding and search pointer lookup (step 54), and
3. Table search (step 56).

The result of the table search (step 56) is a 14-bit connection or channel ID that is used to look up connection information in the VP/VC connection table 100 (step 58).

On a simplified level, the direct lookup step 52 determines whether the PHY 22 and VPI 16 combination corresponds to an active virtual path connection (VPC). If it does, then the VCI field 18 in the incoming ATM cell 10 is irrelevant to the lookup—i.e., it could have any value that should be switched through without modification. Accordingly, if the direct lookup step 52 detects that the PHY 22, VPI 16 information corresponds to an active virtual path connection, the direct lookup step masks the VCI field 18 prior to performing the following hash coding and search pointer lookup step 54.

Briefly, the purpose of the hash coding and search pointer lookup step 54 is to generate a reduced-length hash code from the PHY, VPI, (masked) VCI combination. In the preferred example, the resulting hash code is used, directly or indirectly, by search step 56 to look up a channel identifier stored in a search table. In this preferred example, the hash code produced by step 54 is used as an address into a second look-up table that, for each position, contains a pointer into the search table. Step 56 uses this search pointer (plus the cell's virtual connection information) to look up corresponding connection information in the search table.

Figure 3:
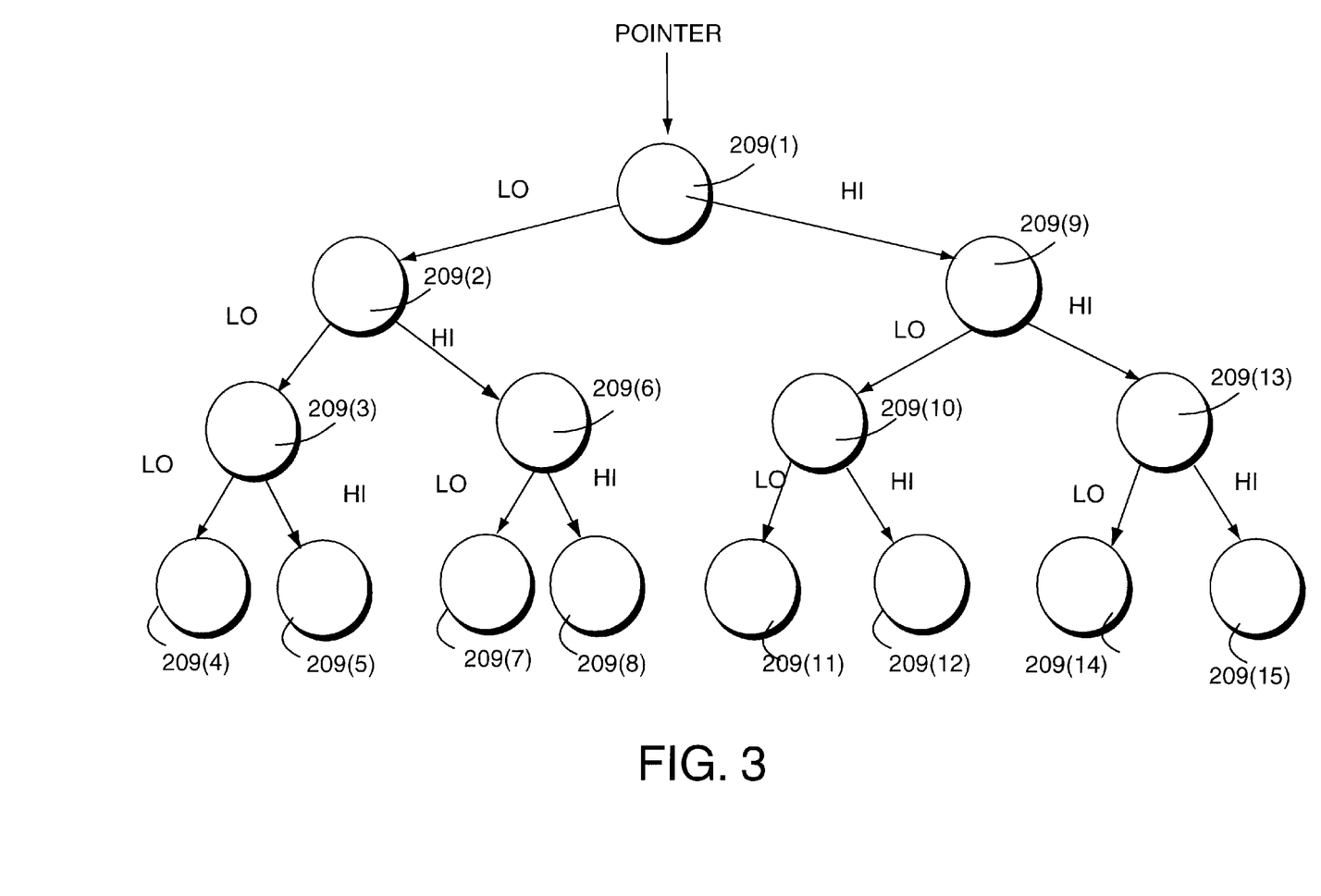
FIG. 3 shows an example VP/VC binary search tree.

Since the hash coding performed by step 54 results in a loss of information, it may happen that many active connections will be hash coded into the same value. In that case, search step 56 must perform a search among all connections with the same hash code. In the preferred example, step 56 uses a binary search to minimize the number of accesses into the search table. FIG. 3 shows an example VP/VC binary search tree that may be maintained in the search table and used for the binary search performed by step 56.

More Detailed Example VP/VC Lookup System

Figure 4:
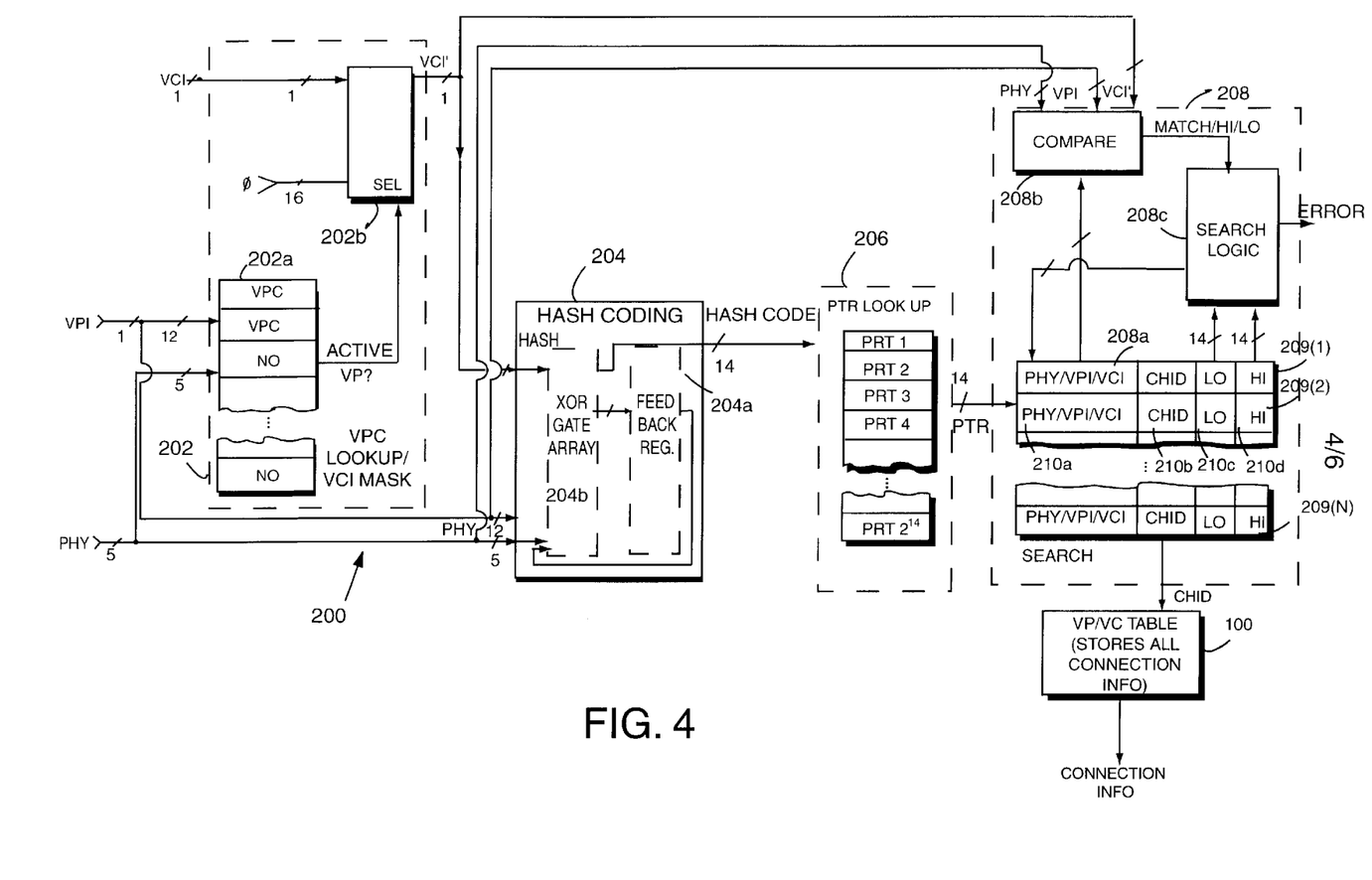
FIG. 4 shows an example VP/VC lookup arrangement.

FIG. 4 shows an example virtual path/virtual channel lookup system 200 that performs the lookup process 50 shown in FIG. 2. In this example:

a VPC lookup/VCI mask block 202 performs the direct lookup step 52 of FIG. 2, a hash coding block 204 and a pointer lookup block 206 perform FIG. 2 step 54, and a search block 208 performs FIG. 2 search step 56.

In this example, both VPI 16 and PHY 22 are inputted to the VPC lookup/VCI mask block 202. Block 202 takes the PHY, VPI combination (seventeen bits) and reads out a 1-bit data information indicating whether that combination is an active virtual path connection ("VPC") or not. This single table 202a does not provide link information, but rather, outputs active virtual path connection information based on both VPI and PHY. In more detail, block 202 of this example includes a direct lookup memory 202a comprising a 128K-by-1 bit RAM. Direct lookup memory 202a may, for example, provide a single bit output for each possible PHY, VPI combination indicating if the combination is an active virtual path connection ("VPC") or not ("NO").

As is well known, there are two types of connections that can be active: active Virtual Path Connection ("VPC") and active Virtual Channel Connection ("VCC"). A VPC is identified by the VPI-field (and the PHY); the VCI field is irrelevant for the switch in this case. All cells belonging to an active VPC are switched the same way, so in order to find the right entry in the channel table, the VCI field must be masked. This is done after a check in the PHY, VPI table 202a in this example.

A VCC is identified by the PHY, the VPI and the VCI. In this case, cells 10 with different VCIs (but the same PHY and VPI) belong to different connections. The switch may simultaneously support VPCs and VCCs.

As described above, the first table 202a (PHY, VPI) in this example tells whether the cell belongs to an active VPC—in which case the VCI field is masked. If it is not an active VPC, it could either be an active VCC or an illegal VPI, VCI combination. Search table 208a is used to make this latter determination in this example.

Thus, in this example, if the PHY, VPI information of a cell 10 corresponds to an active virtual path connection, the VCI field 18 in the cell is irrelevant (i.e., it could have any value that should be switched through without modification). In the case of an active virtual path connection, a multiplexer 202b (or other hardware or software masking function) masks the VPI field 16 to all 0's before using the bit field in the next stage, i.e., PHY, VPI, 0. The VCI field 18 is not masked in this example if the VP connection is not active. The resulting, selectively masked VCI field 18 outputted by multiplexer 202b is designated as VCI' on FIG. 4.

In this example, the masking function described above will also mask all VCI≦31 (or 15) to 0. The reason for this is that these VCI-values are reserved for carrying Operation and Maintenance information related to the Virtual Path i.e., these VCI values can not be used for Virtual Channels. When such a cell 10 arrives, it is treated as belonging to a Virtual Path—even if the VPC/VCI look-up table 202a says that this Virtual Path is not active.

Hash coding block 204 in this example generates a 14-bit hash code from the 33-bit PHY, VPI, (masked) VCI' combination. In this particular example, hash coding block 204 generates a 14-bit long hash code that represents, in a reduced (compressed) length format, the PHY, VPI, VCI' combination. One way of doing this is to generate a CRC 14 value from the 33-bit value. Formally, this is done by appending fourteen zeros at the end of the 33-bit value, i.e., generating a 47-bit value, treating this as a polynomial of degree forty-seven, and dividing this by a generating polynomial of degree fourteen. An example of a generating polynomial is $x^{14}+x^{13}+x^{11}+x^9+1$. Many others will work as well. The CRC is the remainder left when the division has been completed. One efficient way to perform this particular CRC 14 hash coding is to use a 14-bit feedback register 204a and a complex network of many XOR gates 204b. Those skilled in the art will understand that other hash coding arrangements and/or implementations could be used.

The hash code generated by hash coding block 204 is, in this example, used to address into a second lookup table 206 that for each position contains a 14-bit pointer into search table 208. In this example, pointer lookup table 206 has 16K entries each fourteen bits long—for a total size of 224K bits. If desired, the table 206 could be larger than the maximum number of connections, e.g., 32k (for 16k connections). The advantage with this is that the probability for a full binary tree will be reduced, as there are more hash codes available (more trees).

Search block 208 includes a search table 208a that stores search records 209 corresponding to active ATM switch connections. Because the hash coding process performed by hash coding block 204 results in the loss of information, it may happen that many active connections will be hash-coded into the same pointer value generated by pointer lookup 206. In that case, search block 208 must search among all connections within memory 208a with the same hash code to find the one search record 209 corresponding to the cell 10's connection. In this example, search table 208 uses a binary search to minimize the number of steps in the search (e.g., number of accesses into search table 208a).

In theory, all 16K connections could have been hash-coded to the same value, which means that the binary search must be fourteen levels deep. However, since the probability of this is negligible, a more abbreviated search can be used in practical ATM switch implementations. For example, a 4-level search will allow fifteen PHY, VPI, VCI' combinations to be hashed to the same code. The consequence of this is that during the process of establishing a connection, a sixteenth (free) PHY, VPI, VCI' value hashed to a value that fifteen other active connections have already been hashed to, cannot be used. The probability of this happening is very small: approximately $$\frac{N}{e(n+1)!},$$

where n is the size of the tree and N is the size of the search table (e=2.718 . . . ). With n=15 and N=16K , this is below $10^{-9}$ (simulations may be used to verify this). Thus, although there is some blocking probability (i.e., a free PHY, VPI, VCI combination can not be used due to a full binary search tree), this can be neglected for all "normal" usages of PHY, VPI, VCI.

In the example embodiment, each search record 209 in search table 208 includes the following fields:
  PHY/VPI/VCI combination field 210a (thirty-three bits),
  Channel identifier field 210b (fourteen bits),
  Low pointer field 210c (fourteen bits), and
  High pointer field 210d (fourteen bits).
The size of search table 208a in this example is thus 16K times seventy-five bits, i.e., 1.2 megabits.

When the VPI, VCI is used in the binary search, it is either found or not. If it is found, the VCC is active; if it is not found, the VCC is not active. An overall combined effect of cascaded tables 202a and 208a can be summarized as follows:
  Active VPC: the PHY, VPI combination is found in the first table 202a; VCI is masked; hash and binary search gives the connection number (entry in connection table 208a)
  Active VCC: the PHY, VPI combination is not found to be active in the first table 202a (=no VPC). The PHY, VPI, VCI combination is found after hash and binary search, and the connection number is read out from search table 208a.
  Illegal VPI: VCI: the PHY, VPI is not found in the first table 202a (=no VPC). The PHY, VPI, VCI combination is not found after hash and binary search in the search table 208a.

Thus, in a sense, in this example a VPC is found active directly in the first table 202a but an active VCC is found active indirectly after the hash and binary search (a "hit" in the search) in the search table 208a.

Referring to FIGS. 3 and 4, when search block 208 performs a search, it uses the 14-bit pointer generated by pointer lookup 206 to access the "root" search record 209(1) of a binary search tree containing one to fifteen records 209(1)–209(15). A compare block 208b compares the PHY 22, VPI 16, (masked) VCI' information associated with ATM cell 10 with the PHY/VPI/VCI' combination field 210a within the accessed search record 209. If the PHY, VPI, (masked) VCI' combination associated with the cell 10 is the same as the value stored in the accessed search record 209, search logic 208c stops the search and the channel identifier 210b from the record is read out. If compare block 208b determines that the PHY, VPI, VCI' value associated with the cell 10 is lower than the one stored in the accessed search record 209, the low pointer 210c is read out and used to access another (particular sorted) search record 209(2) of the binary search tree. If compare block 208b determines that the PHY, VPI, VCI' value associated with cell 10 is higher than the value of field 210a of the accessed search record, search logic 208c reads out the high pointer 210d and uses it to access another (particular sorted) search record 209(9) of the binary search tree. If four searches have been made without any hit, search logic 208c generates an "illegal cell" (error) signal, and cell 10 is discarded.

Once the appropriate record 209 containing a matching PHY, VPI, VCI' value has been found, the channel identifier 210b of that record is used as an entry into the VP/VC connection table 100 where all information relevant to the connection is stored.

Two PHY, VCI, VPI combinations hashed by hash coding block 204 into the same hash code will provide different 19-bit quotients of the CRC polynomial division described above. To reduce the size of search table 208a, it is possible to store the quotient (nineteen bits) of the CRC polynomial division instead of the complete 33-bit PHY/VCI/VPI combination within the search records 209 to save memory space. This alternative approach will require some additional (large) number of XOR gates in hash coding block 204 to output the quotient.

Example Software Driver Functions

Figure 5:
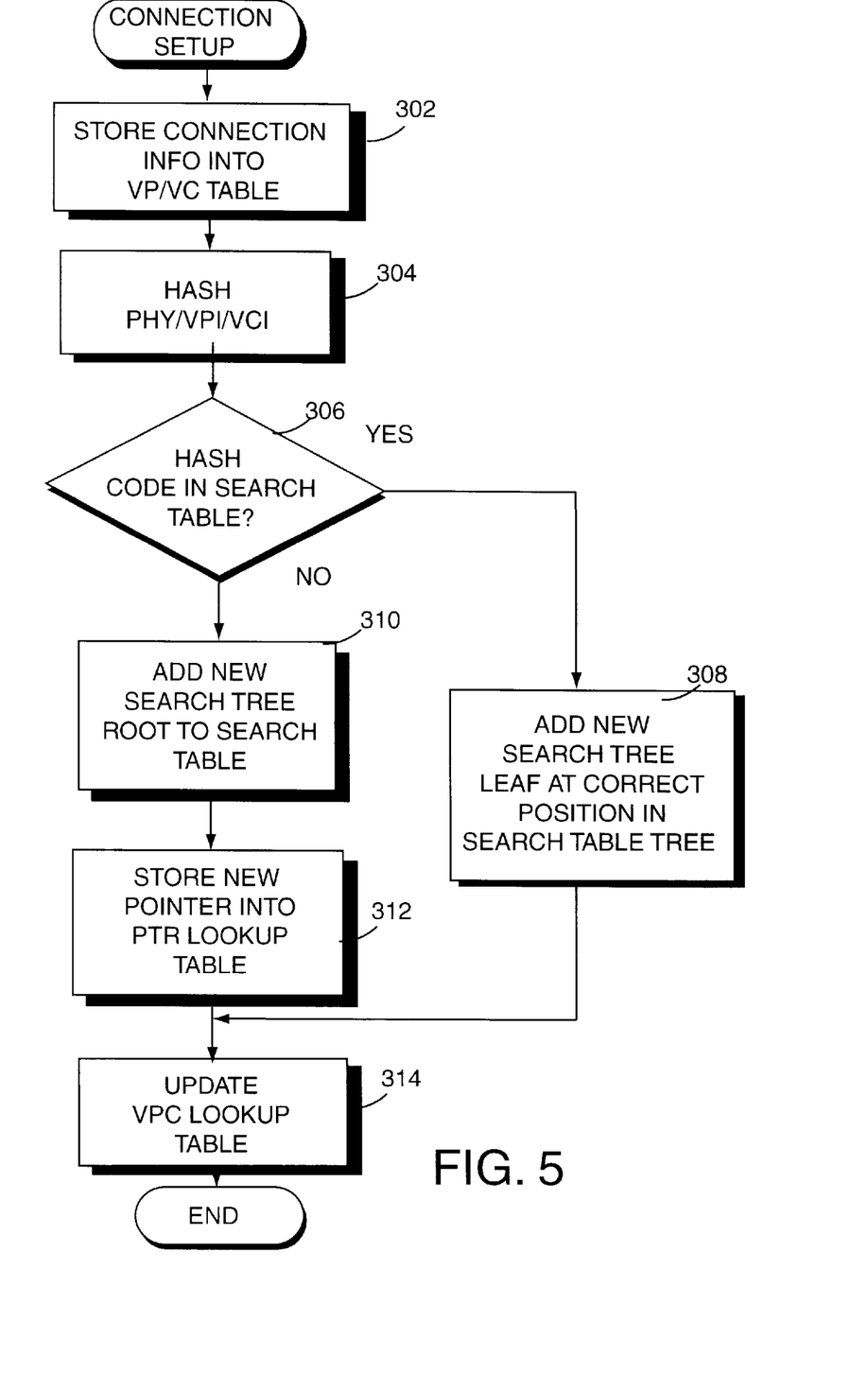
FIG. 5 shows an example connection setup process.

The correct information must be stored in the various tables 202a, 206, 208a when a new connection is set up. FIG. 5 shows an example connection software driver connection setup. The steps shown in FIG. 5 may be performed in any desired order to accomplish the same result.

As shown in FIG. 5, the driver (or some other ATM switch call routing process) must store the appropriate connection information into VP/VC connection table 100 (FIG. 5, block 302). The driver software must calculate the same 14-bit hash code that hash coding block 204 will calculate based on the PHY, VPI, VCI' combination (the driver may perform this calculation in software and/or by using hardware support) (FIG. 5, block 304). The driver may then determine whether a channel with the same hash code already exists within search table 208a (FIG. 5, decision block 306). If a channel with the same hash code already exists ("yes" exit to decision block 306), the driver must add a new "leaf" to an existing binary search tree already stored in search table 208a (FIG. 5, block 308). If a channel with the same hash code does not already exist within search table 208a, the driver must add a new search tree "root" to the search table (FIG. 5, block 310), and store a new hash code pointer into the pointer lookup table 206 (FIG. 5, block 312). The driver must also update the VPC table 202a to indicate that a new connection has been established (FIG. 5, block 314).

In this example, the driver is responsible for maintaining the binary search tree in a sorted condition so that the binary search will work. Thus, to add a new search tree leaf (block 308), the driver in this example searches through search table 208a with the new PHY, VPI, VCI combination, and inserts the new leaf at the correct (sorted) position within the existing search tree. It may happen that the search tree becomes unbalanced, depending upon the history of connection set ups and tear downs. For example, the PHY, VPI, VCI combination associated with a "root" record 209 for a particular search tree may have a relatively high or relatively low value. This means that the driver will not be able to find a place for the new combination even though the binary search tree is not complete (i.e., it has less than fifteen branches and leaves). In this case, the driver should balance the tree by first sorting the entries linearly and then building up the tree by taking the middle entry as the root and continuing with the upper and lower subtrees. As the number of entries is fifteen or less, this procedure should not take very long. Once the new search tree is created, the driver can place the new tree at a different (free) location in search table 208a, together with the correct channel identifiers 210b. When this has been done, the driver updates the pointer in lookup table 206 to point to the new root. After this, the old tree can be removed or overwritten.

Figure 6:
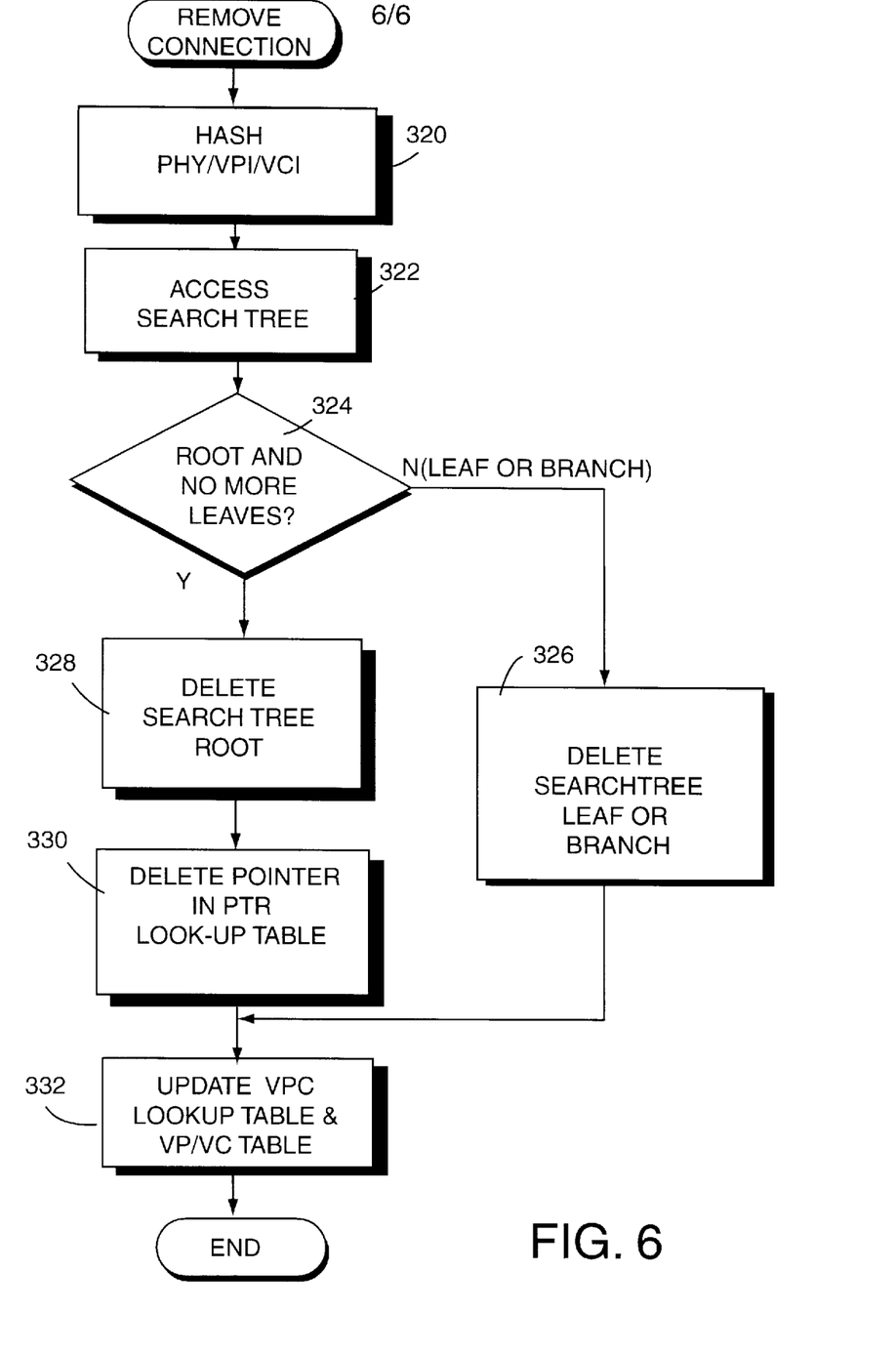
FIG. 6 shows an example connection removal process.

FIG. 6 shows an example software driver connection removal process. When the driver removes a connection, it reconfigures the search tree—but this is not so complicated. If the removed connection is located at a leaf ("yes" exit to decision block 324), the leaf is simply removed (block 326). If the connection removed is at a branch, the branch is removed and is replaced by the lowest connection in the upper tree or the highest connection in the lower tree. For example, referring to FIG. 3, removal of leaf 209(2) may involve replacing that leaf with leaf 209(5) or 209(7). The remaining subtrees do not have to be reconfigured. If the root is removed and there are more leaves, then a leaf replaces the root. If there are no more leaves and removal of the root is required ("yes" exit to decision block 324), the process deletes the search tree root record 209(1) (FIG. 6 block 328), and deletes the associated pointer within pointer lookup 206 (FIG. 6 block 330). The driver (or other call routing process) may also update the VPC table 202a to indicate that the connection is no longer active (FIG. 6 block 332).

The present invention thus provides a new, efficient approach to ATM connection table lookup that minimizes the number of tables and memory lookups through use of hash coding and binary table search techniques. The virtual connection information associated with an incoming ATM cell is hash coded. The hash code provides a compressed representation of the virtual connection information— allowing the address space of a table the hash code accesses to be much smaller than the maximum number of possible virtual connection combinations that can be encoded in the ATM cell header without restricting the set of virtual connection combinations that may be used. A binary search can be used to efficiently locate the particular search record corresponding to the cell's connection—providing relatively few memory accesses (e.g., 1+1+4*2=10).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In an ATM switch of the type that routes cells from an input port to an output port over a virtual connection based at least in part on virtual connection information provided within a cell header, a virtual path/virtual channel lookup process including the following steps:

(a) hash coding cell virtual connection information including Virtual Path, Virtual Channel and physical link information to provide a reduced length hash code; and (b) searching for connection information based at least in part on the reduced length hash code.

2. A method as in claim 1 wherein hash coding step (a) includes the step of hash coding at least a virtual path identifier and a physical link identifier.

3. A method as in claim 1 wherein said searching step (b) includes the step of performing a binary search based at least in part on the hash code.

4. A method as in claim 1 wherein hash coding step (a) includes testing whether the virtual connection information corresponds to an active virtual path, and selectively masking at least a part of the virtual connection information based on the results of the test.

5. A method as in claim 4 wherein the selectively masking step comprises selectively masking a virtual channel identifier.

6. A method as in claim 1 wherein said method further includes the step of looking up a search table pointer based on the hash code, and searching step (b) includes accessing a search table based at least in part on the search pointer.

7. A method as in claim 1 wherein the hash coding step (a) includes performing a CRC polynomial division.

8. A method as in claim 1 wherein hash coding step (a) includes processing the virtual connection information at least in part with a feedback register and a network of XOR gates.

9. A method as in claim 1 wherein said searching step (b) includes performing a search based on the hash code and the virtual connection information.

10. A method as in claim 1 wherein said searching step (b) includes searching a search table for search records indexed by the hash code that contain matching virtual connection information.

11. A method as in claim 1 step (b) includes selecting plural records corresponding to the hash code, and selecting one of the plural records based on the virtual connection information.

12. A method as in claim 1 wherein step (a) includes generating a hash coding byproduct, and step (b) includes selecting plural records corresponding to the hash code, and selecting one of the plural records based on the hash coding byproduct.

13. A method as in claim 1 wherein said searching step (b) includes performing a multi-level binary search, and generating an error if a corresponding connection record is not found after a predetermined number of binary search levels.

14. A method as in claim 1 further including the step of balancing a binary search tree, and step (b) is performed by searching the balanced binary search tree.

15. A method as in claim 1 wherein the method further includes:

determining whether there is an active VPC based at least in part on both PHY and VPI virtual connection information; and step (b) includes the step of determining whether there is an active VCC based on a search table indexed by the hash code.

16. In an ATM switch of the type that routes cells from an input port to an output port over a virtual connection based at least in part on virtual connection information providing within a cell header, a virtual path/virtual channel lookup arrangement comprising:

a hash coding block that hash codes cell virtual connection information to provide a reduced length hash code; and a search table that searches for connection information based at least in part on the reduced length hash code.

17. An arrangement as in claim 16 wherein the hash coding block includes a feedback register and a gate array.

18. An arrangement as in claim 16 further including means for selectively masking a portion of the virtual connection information based on whether the virtual connection information corresponds to an active virtual path.

19. An arrangement as in claim 16 wherein the search table includes compare logic that compares the virtual connection information with at least portions of search records indexed by the hash code.

20. An arrangement as in claim 16 wherein the search table includes means for storing a binary search tree.

21. An arrangement as in claim 16 wherein the search table includes a memory that stores plural search records each including a virtual connection information field, a connection identifier field, a low field and a high field.

22. An arrangement as in claim 16 wherein the hash coding block hash codes a Virtual Path Identifier, a Virtual Channel Identifier and physical link information.

23. An arrangement as in claim 16 wherein the arrangement further includes a circuit that determines whether the virtual connection information corresponds to an active virtual path connection; and the search table is used to determine whether the virtual connection information corresponds to an active Virtual Channel connection.

24. A virtual path/virtual channel lookup arrangement comprising:

hash coding means, connected to receive cell virtual connection information, for hash coding the cell virtual connection information to provide a reduced length hash code; and connection information searching means, coupled to receive the reduced length hash code, for searching connection information based at least in part on the reduced length hash code.

25. An arrangement as in claim 24 wherein the hash coding means comprises means for hash coding a Virtual Path Identifier, a Virtual Channel Identifier and physical link information.

26. A cell routing method including:

(a) obtaining virtual connection corresponding to a cell;

(b) hash coding at least a part of the virtual connection information to provide a reduced length hash code;

(c) using the reduced length hash code, directly or indirectly, to look up a binary search tree stored in a search table, the binary search tree being capable of including plural search records;

(d) selecting one of the plural search records based at least in part on a comparison between the search record contents and the obtained virtual connection information;

(e) obtaining virtual connection information based on the selected search record; and (f) routing the cell through a digital communications network based at least in part on the virtual connection information obtained by step (e).

27. A cell routing method as in claim 26 wherein the hash coding step (b) comprises hash coding at least portions of VPI, VCI and PHY information.

28. In an ATM cell routing determination arrangement that hash codes cell virtual connection information including VPI, VCI and physical link information to provide a reduced length hash code, a lookup method comprising:

(a) looking up a record in a first table based on a combination of both PHY, VPI virtual connection information;

(b) searching, based on said reduced length hash code, for a record in a second table based on a combination of the PHY, VPI virtual connection information and VCI virtual connection information;

(c) determining based on the first table look up whether the cell has an active virtual path connection; and (d) determining based on the second table look up whether the cell has an active Virtual Channel connection.

29. A method as in claim 28 wherein step (b) comprises searching the second table based on a selectively masked VCI hash coded with PHY and VPI to provide said reduced length hash code.

30. A method as in claim 28 further including routing the cell based on information derived from the record obtained from the second table.

* * * * *